United States Patent [19]
Fried et al.

[11] 4,414,952
[45] Nov. 15, 1983

[54] ACTUATOR FOR AN AIR VALVE PLACED IN THE BOOST AIR DUCT OF AN IC ENGINE

[75] Inventors: Reinhard Fried, Nussbaumen, Switzerland; Rudolf Heller, Munich; Heimo Hubner, Greifenberg, both of Fed. Rep. of Germany

[73] Assignees: BBC Aktiengesellschaft, Brown, Boveri & Cie., Baden, Switzerland; Knorr-Bremse GmbH, Munich, Fed. Rep. of Germany

[21] Appl. No.: 232,025
[22] PCT Filed: May 23, 1980
[86] PCT No.: PCT/DE80/00078
  § 371 Date: Feb. 8, 1981
  § 102(e) Date: Feb. 4, 1981
[87] PCT Pub. No.: WO80/02725
  PCT Pub. Date: Dec. 11, 1980

[51] Int. Cl.[3] .............................................. F02B 33/02
[52] U.S. Cl. ..................................... 123/559; 60/611
[58] Field of Search ................... 123/559; 60/600, 601, 60/611

[56] References Cited
U.S. PATENT DOCUMENTS
2,853,987  9/1958  Berchtold et al. ............... 123/65 E
3,180,330  4/1965  Barnes ................................. 123/559

Primary Examiner—William A. Cuchlinski, Jr.
Attorney, Agent, or Firm—Pollock, Vande Sande & Priddy

[57] ABSTRACT

An actuator for an air valve placed in the boost air duct of an IC engine and, more specially, of such an engine supercharged or boosted by a pressure wave supercharger, the air valve being in its closed position on starting up the IC engine from cold, at which time the engine takes in charge air by way of a breather valve, and at the end of the starting stage the valve in the boost air duct is moved into its open position and is kept open while the engine is running. After shutting down the engine, the valve in the intake pipe is automatically moved back into its closed position and the air valve is moved into its open position by the pressure of the air forced into the boost air duct and/or by vacuum against an air valve spring closing force.

20 Claims, 9 Drawing Figures

ACTUATOR FOR AN AIR VALVE PLACED IN THE BOOST AIR DUCT OF AN IC ENGINE

SUMMARY OF THE INVENTION

The present invention relates to an actuator for an air valve in the boost air duct of an IC engine.

BACKGROUND OF THE INVENTION

From the prior art it is known to provide a butterfly valve in the boost air duct of, for example, a supercharged diesel engine for help in starting up the engine. Such a valve is shut at least till the engine has fired, and then the valve is opened, at the latest, by the time the engine has run up to a speed outside the idling range. The valve is then kept open till the engine is shut down again. More specially, diesel engines with pressure wave superchargers must have a butterfly valve at this position working in this manner, as otherwise, if transfer of gas and air between the supercharging air and exhaust gas sides of the supercharger occurs during the start-up stage at the time of the first strokes of the engine on starting, such transfer of exhaust gas would be likely to cause exhaust gas to enter the boost air duct of the engine and cause immediate stoppage of the engine.

German Published Application No. 2,631,257 discloses an actuator for a butterfly air valve in the boost air duct of a diesel engine, more specially a diesel engine with a pressure wave supercharger. The actuator has a shut-off valve in an actuator line running from an oil pressure line of the diesel engine to an actuator space for an actuator piston of the butterfly valve, the other side of this piston being acted upon by a force at all times. The shut-off valve is designed to be moved in the opening direction by a piston (which is acted upon on one side by air from the boost air duct for moving the piston in the said opening direction, and acted on on its other side by a spring) and may only be closed when there is no oil pressure. The shut-off valve is actuated by the actuator piston and may be closed in the rest position of the actuator piston (in which the butterfly air valve is closed), when there is no oil pressure present in the system.

OBJECT OF THE INVENTION

The object of the present invention is an actuator of the type described hereinabove which, while simple in structure, enables automatic actuation of the air valve, in a way fully in harmony with desired functions, even without connection with the pressure oil line of the IC engine.

In one embodiment of the invention, the air valve is fixed to a shaft extending out of the boost air duct so that the air valve is swingably supported in the wall of the boost air duct and, for turning the shaft into the closed position of the air valve, there is at least one spring acting on the shaft, while for turning the shaft in the opposite direction into the open position of the air valve, the shaft is connected by a lever system to at least one piston actuated by the pressure of the supercharging air and/or by vacuum.

BRIEF INTRODUCTION TO THE DRAWINGS

In order that the invention may be more clearly understood, reference will now be made to the accompanying drawings, wherein several embodiments are shown for purposes of illustration.

DESCRIPTION OF PREFERRED EMBODIMENT

Figure 1:
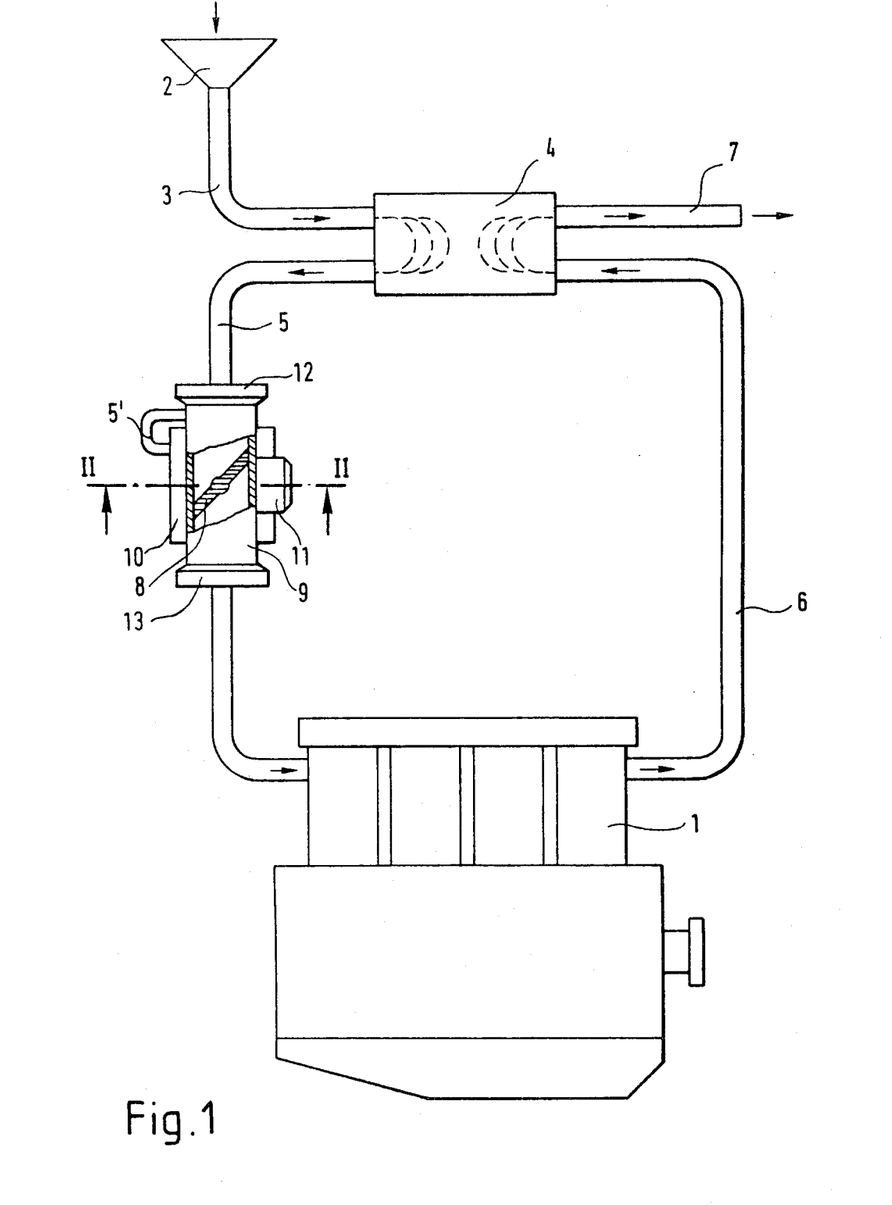
FIG. 1 is a view of the actuator connected to a diesel engine, for example.

In FIG. 1, a diesel engine (not shown in detail) is numbered 1. An intake or induction pipe 3 extends from an intake filter 2 to a supercharger 4 which is connected on one of its sides by way of a boost air duct 5 and on its other side by way of an exhaust pipe 6 with engine 1. Through a pipe 7 it is possible for the exhaust gases to escape from the supercharger 4 to atmosphere. In the boost air duct 5, there is a butterfly air valve 8 having an actuator. The valve 8 is next to a housing part 10 for the air valve actuator. The housing part 10 is connected to air pipe 5' for driving the actuator, the pipe 5 being branched off from boost air duct 5.

The actuator, of which a more detailed account will be given hereinbelow, is responsible for moving the air valve into a rest or closed position, in which the boost air duct 5 is closed to the passage of air, and into a working or open position in which the boost air duct 5 permits the passage of compressed air from the supercharger to the engine.

Downstream from air valve 8 there is a breather or bypass valve 11 through which, when the air valve 8 is closed and when there is a certain degree of vacuum in the part of the boost air duct 5 extending from valve 8 to engine 1, atmospheric air may be aspirated by engine 1.

The supercharger 4 may be of any desired design, but is preferably a pressure wave supercharger in which, without clearly defined separation of the exhaust gas from the boost or blown air, the energy of the exhaust gas is used for compression of the intake air. The mechanical drive for the supercharger 4 necessary for this purpose is not shown in FIG. 1.

Figure 2:
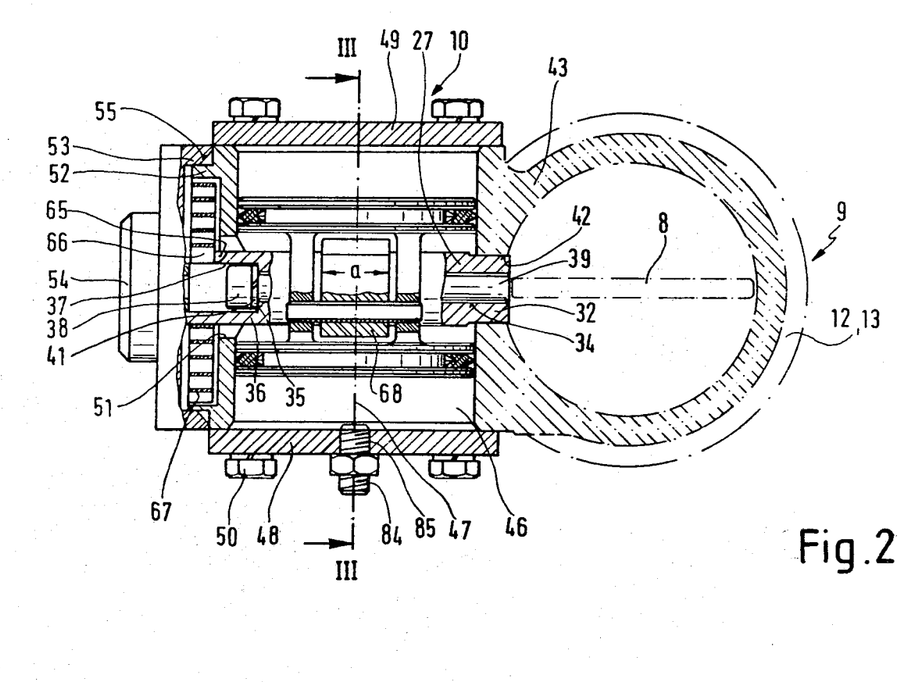
FIG. 2 is a section through the actuator of FIG. 1 on the line II—II of FIG. 1.

FIG. 2 is a cross-section through the two housing parts 9 and 10 for the butterfly air valve 8 and the actuator. These form a housing unit, but could also be in the form of separate housings joined by flanges, if desired.

Housing part 9 is made up of a length of pipe with flanges 12 and 13 at its opposite ends (see FIG. 1) for connection with the air duct 5.

For turning butterfly air valve 8, it is fixed to the end 32 of a shaft 27.

Shaft 27 has a central longitudinal bore 34 which is counterbored at 37 at the other end 36 of shaft 27 so that an inner shoulder 35 is formed, the head 38 of a bolt resting against shoulder 35, while the shank part 39 of the bolt extends through bore 34 and is tightly screw-joined with the butterfly air valve 8. The bolt head 38 has a slit washer 41 between it and the inner shoulder 35.

Shaft 27 is supported in a bore 42 in a housing partition wall 43 between the housing part 9 in which the butterfly air valve 8 is located, and the housing part 10 in which the actuator for the air valve 8 is located.

The shaft 27 extends through and across cylindrical interior 46 of the housing part 10. The axis 39 of the shaft is lined up with a diameter in the central radial plane of interior space 46. The axis 47 of this space 46 is thus normal to the shaft axis 39. The cylindrical interior 46 is sealed at its two outer ends by two housing end plates 48 and 49 fixed in position by end plates screws 50 extending through holes (not shown) in the end plates at their corners radially outside interior 46 and received in threaded holes in the wall of the housing.

Housing part 10 also has a side opening 51, centered on the shaft axis, the shaft end 36 extending with play through this opening. On the exterior of the housing part 10 there is, at some radial distance from the opening 51, an axially projecting annular lip 52 of the housing, and over this lip the lateral edge 53 of a cover 54 is slipped. A gasket 55 is placed between cover edge 53 and housing lip 52 to keep interior space 46 air-tight.

Shaft end 36 has an axial slot 65 for insertion of the inner end 66 of a spiral metal spring 67. The outer end of metal spring 67 is fixed to housing lip 52. This metal spring, which is a bimetallic spring in the illustrated example, is so tensioned that when, after shutting down, the engine has cooled to a predetermined minimum temperature, it retains air valve 8 on shaft 27 in its closed position, while otherwise it is retained in its open position.

Centrally of the cylindrical interior 46 of housing part 10, a two-armed lever 68 is keyed on shaft 27 by way of key 69' (FIG. 3) partly within the shaft and partly within the lever 68. The breadth of the lever 68 is equal to a. The lever 68, which is longitudinal in cross section, is flattened on both sides symmetrically to a plane through the axis of the shaft, so that in this plane it has a wall thickness b substantially greater than the wall thickness c as measured in a plane normal to this direction.

In the inner space two pistons 69 and 70 are arranged, for movement away from each other by driving air. Pistons 69 and 70 have piston rings 71 and 72 movably positioned in grooves 71' and 72'. Each piston has two parallel attachments 73, 74 and 75, 76, respectively, the attachments being generally axial and being eccentric with respect to their pistons 69 and 70. The ends of the attachments are so spaced on the pistons that they are on the two sides of the two ends of lever 68 with play between them and the lever. Pistons 69 and 70, which are generally the same in structure, are so placed in the cylindrical inner space 46 that the attachments are pivotally connected with lever 68 at diametrically opposite points by connecting pins 77 and 78, which are parallel to the shaft 27.

Figure 3:
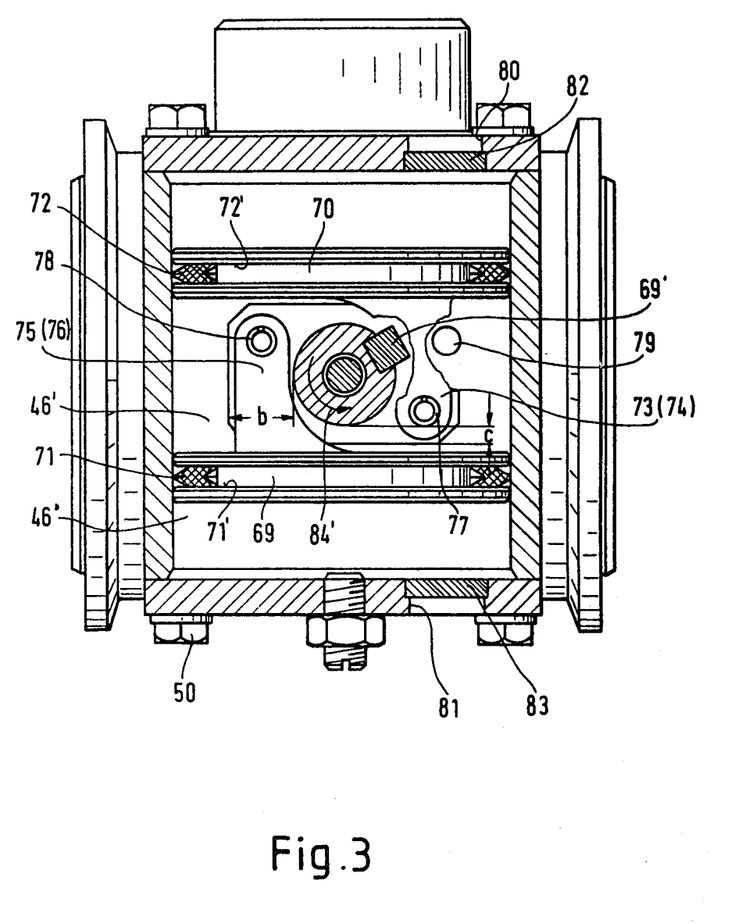
FIG. 3 is a section on the line III—III of FIG. 2.

In FIG. 2 only one pin 77 is shown, in longitudinal view, it being slipped through the two parallel legs 73 and 74 of piston 70. In FIG. 3, the two pins 77 and 78 are shown in end view. In this figure, only one of the two legs (75, 73) on each of the two pistons 70 and 71 is to be seen.

Housing part 10 has a bore 79 extending into the cylindrical inner space 46 between the two pistons 70 and 71. Bore 79 is connected to the chamber for air valve 8 at a point upstream of this valve. In the two housing end plates 48 and 49 there are vent holes 80, 81 having air filters 82 and 83 for keeping the inner space 46 clean and through these holes the outer faces of the pistons, not acted upon by the supercharging pressure, are connected to atmosphere. In end plate 48 there is furthermore a threaded hole 85 for an adjustment limiting screw 84, which may be fixed so as to extend into the cylindrical inner space 46 to a predetermined extent, so as to limit the motion of the pistons 69 and 70.

The outer faces of pistons 69 and 70 are somewhat barrel-like or spherical so that, on being moved in the cylindrical space 46, they may assume positions at a small angle to the axis of cylindrical space 46 without jamming. Putting it differently, pistons 69 and 70 wobble on being moved in opposite directions about their common axis, the shaft 27 being turned and pins 77 and 78 being turned arcuately about the shaft axis.

Piston rings 71 and 72 are retained in air-tight abutment against the face of the cylinder about space 46 during wobbling of the pistons 69 and 70 and, for this purpose, the piston rings have dovetailed sections towards their inner edges forming sealing lips abutting like check valves against the axially opposite walls of grooves 71', 72' so that, when the system is under pressure, air under pressure is able to make its way under the piston rings 71 and 72, so that they are forced radially outwards continuously by the compressed air. It will be clear that the system will be so designed that, even when the pistons 69 and 70 form their greatest angles to radial planes, there will be no chance of piston rings 71 and 72 being forced out of their grooves 71' and 72'.

By adjustment of the depth of penetration of limiting screw 84 within the cylinder, it is possible, as already stated, to fix the length of the piston motion, and thus the angle of turning of shaft 27 and the angle of motion of butterfly air valve 8, as desired. The actuator of the invention for driving the butterfly air valve 8 operates as follows.

When the diesel engine 1 is turned over for starting by the starter motor, a vacuum will be produced in the boost air duct 5 running from air valve 8 to engine 1, because air valve 8 is closed and the connection to the intake filter is sealed. Because of the vacuum the vent valve 11 is opened so that the charge air necessary for starting the engine reaches the boost air duct by way of the vent valve.

After the diesel engine 1 has fired a number of times, exhaust gases under pressure will be forced out into the exhaust gas pipe 6 and make their way to the supercharger 4 so that the pressure wave supercharging process is started, if the supercharger is in fact designed for pressure wave operation. On such pressure wave operation taking place, because the air valve 8 is shut, exhaust gas cannot be taken in; this would be undesirable because of the effect of "smothering" and then stopping the diesel engine, even though there is a connection, through the supercharger 4, between the exhaust gas pipe 6 and the boost air duct 5. In fact, exhaust gas is kept clear of the boost air duct because of the shut air valve 8, so that there is no intake of exhaust gas by diesel engine 1. The exhaust gas is vented to atmosphere by way of pipe 7. Because the pressure wave supercharging process has now been started up by the exhaust gases, the charge air taken in through intake filter 2 will have the effect of building up pressure in that part of the boost air duct which is between the air filter 2 and air valve 8, such air under pressure making its way through branch pipe 5' into the inner space 46 between pistons 69 and 70. As soon as a certain pressure level of, e.g., 0.2 bar is present in this space, because the diesel engine 1 has started, the two pistons 69 and 70 are axially moved apart from the position shown in FIGS. 2 and 3 against the closing force of metal spring 67, said spring otherwise shutting air valve 8. On such motion of the pistons, shaft 27 is turned in the opening direction of air valve 8, as indicated by arrow 84' in FIG. 3.

An advantage is produced if the system is so designed that the pressure necessary for opening air valve 8 is sufficient only when the diesel engine 1 has run up to a speed above idling speed, the pressure coming from supercharger 4. With such a design, a long as the diesel engine 1, while still cold, is only ticking over or running slowly in the idling range after starting, the actuator will keep butterfly air valve 8 closed, making it easier for the diesel engine to be run up to speed.

After the opening of the butterfly air valve 8, the necessary gauge pressure is kept up in branch pipe 5' and in the space, joined therewith, between pistons 69 and 70, while the engine 1 is running so that the pistons are kept in the position in which they are moved away from each other, against the returning force of spring 67, the butterfly air valve 8, joined to the shaft 27, and the shaft itself being turned into open position. Now the supercharger 4, which has been fully started up, has the effect of supplying the diesel engine 1 with supercharging air so that the latter operates normally with the supercharging effect.

If, before being heated up to the normal working temperature, the diesel engine 1 is shut down or stalled, the supercharging pressure will be decreased and, for this reason, the gauge pressure in the space between the pistons 69 and 70 will quickly drop to a low value, the pistons 69 and 70 will be moved by the returning force of metal spring 67 into their starting position as seen in FIGS. 2 and 3, the shaft 27 together with butterfly air valve 8 being turned against the direction of arrow 84' into their closed position. If, however, the engine has run long enough to be heated up approximately to its working temperature, the bimetallic spring will have been heated up by the heated supercharging air to such a temperature that it will not exert any return force on shaft 27 and, in fact, will exert an opposite force, so that the shaft 27 will be acted on by a turning force directed in the opening direction of butterfly air valve 8.

The result is that, if the engine is stopped on purpose or otherwise, the air valve 8 will be kept in the open position by the heated-up bimetallic spring 67, although the pressure of the supercharging air no longer takes effect and, for this reason, pistons 69 and 70 are not acted upon by any such pressure. The design of the bimetallic spring 67 may, for example, be such that up to a temperature of 40° C., it has enough force to keep shaft 27 in closed position, while at a temperature over 90° C. its force on the shaft 27 has the effect of moving the air valve 8 into the open position.

If, for this reason, the engine is shut down after being heated up to the full working temperature, the air valve 8 will be kept in the open position under the effect of the bimetallic spring 67 till the spring has cooled down to a temperature of, for example, under 40° C., at which temperature the temperature of the engine itself will have dropped to the extent that, for starting up again, the air valve has to be closed in the starting up stage. This, however, will not be the case if, after extended operation, the shut down engine is still hot enough and, for this reason, the bimetallic spring is still at a temperature high enough for the spring to move the air valve 8 into the open position. If, for this reason, the shut down engine is started again before it has cooled down to below a predetermined temperature, the air valve 8 will be open and the engine may, for this reason, be run up to its full power range more quickly than if the air valve 8 first had to be opened by the control system.

FIGS. 4 to 9 show embodiments of the invention, to be described hereinbelow, in which a simple steel spring is used in place of a bimetallic spring. In these examples, it is possible for the air valve to be closed every time the engine is shut down because, once the effect of the pressure acting on the pistons comes to an end, the system is moved back by the tensioned or cocked spring. Furthermore, the butterfly valve may be completely or partly closed even while the engine is running, this being important in the event of any malfunction in the supercharger such that exhaust gases from the engine might make their way into the boost air duct 5, the engine then being "smothered." In such case, the air valve then generally being closed, the exhaust gas will be shut off and fresh air will be taken in by way of vent or bypass valve 11 by the engine.

When a normal spring is used, the position of the air valve will be proportional to the supercharging pressure, this being undesirable because the air valve would keep oscillating. A further system is needed to lock the air valve in its completely open position when the engine is running.

In the diagrammatic FIGS. 4 to 9, in which elements which are the same as in FIGS. 1 to 3 are identified by the same reference numbers, these further parts of the system and different forms of piston operation are shown in some detail.

In these embodiments, the air valve 8 is shown in closed position, the positions of the pistons 69 and 70 being in line with this valve position. To make the figures simpler, the vent valve 11 is, in each case, to be seen in its rest or closed position, without this having any connection with the position of valve 8.

Figure 4:
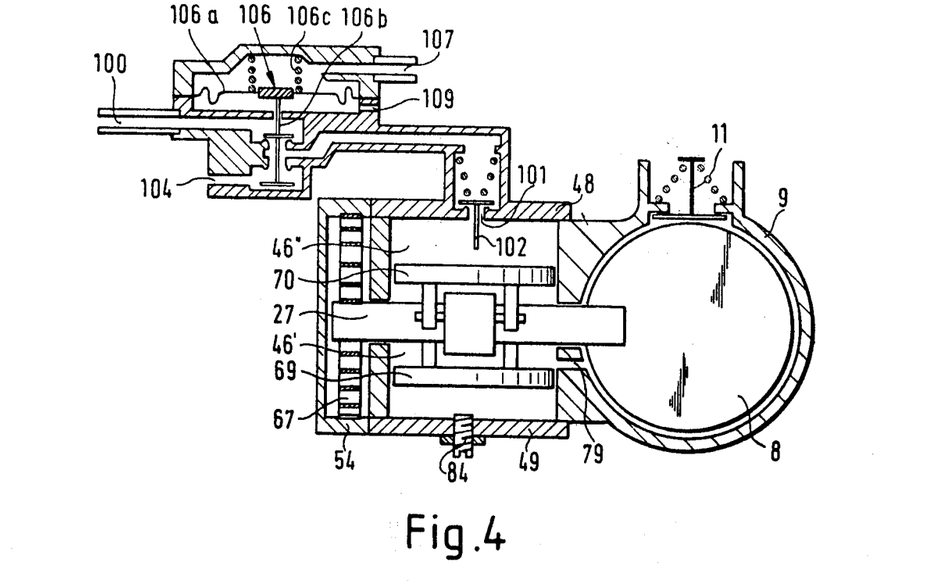
FIGS. 4 to 9 are sections, taken in the same direction as the section of FIG. 2, through further embodiments of actuators.

In FIG. 4, the space 46' between the pistons is, as in FIG. 3, joined by way of aperture 79 with compressed air taken from the part of the supercharging air intake pipe 5 upstream of valve 8, so that opening motion of valve 8 is started. When pistons 69 and 70 are moved away from each other, the outer face of piston 70 abuts against the spring-loaded poppet valve 102 within opening 101 in the end plate 48, so that the opening is cleared and so that the space 46" above piston 70 is joined by way of a diaphragm valve 106 and a vacuum line 100 with a vacuum source, which may be the vacuum pump of a power braking force amplifier.

In FIG. 4, the diaphragm valve 106 is in its rest position, i.e., when the IC engine is not running. Valve 106b, actuated by spring-loaded diaphragm 106a, is responsible for keeping open a vent line 104 connected to atmosphere, while the vacuum line 100 is kept shut off from the vacuum source.

When the engine is running, the top side of the diaphragm is acted upon by a vacuum via an air pipe 107, because pipe 107 is connected to the intake pipe 3 on the inlet side of supercharger 4. By way of an aperture 109, the lower side of the diaphragm is connected with atmosphere at all times. Valve 106b fixed to diaphragm 106a is lifted against the effect of spring 106c, so that vent pipe 104 is shut off and vacuum line 100 is freed up, for which reason, by way of lifted poppet valve 102, air is aspirated out from piston space 46''', so that the space is put under vacuum, the vacuum effect supporting the effect of the pressure in the space 46' between the piston, so that, without being dependent on the pressure changes caused by changes in the engine loading, the air valve 8 is kept fully opened at all times.

Figure 5:
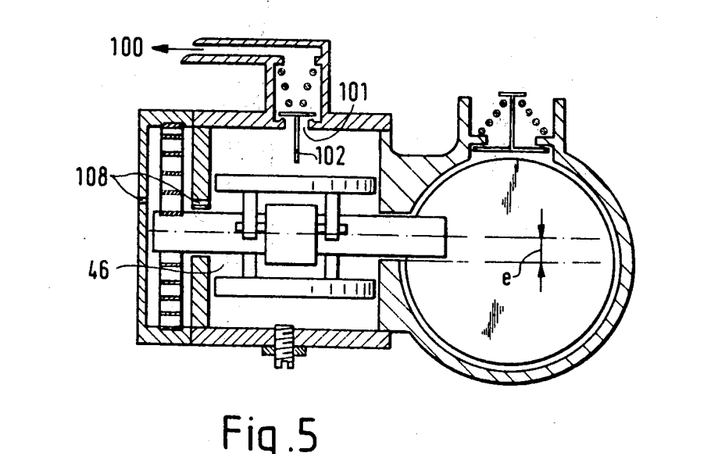
Figure 6:
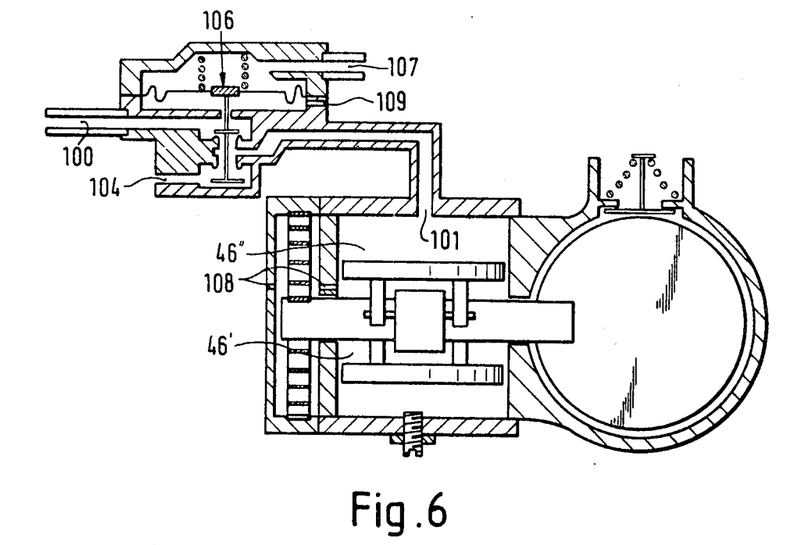
Figure 7:
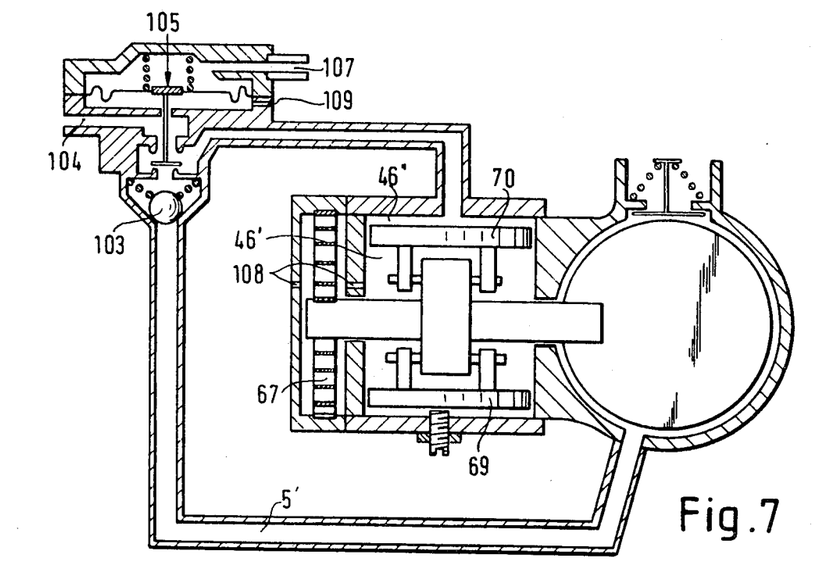

If now, for example, valve 8 must be closed because of malfunctioning in the supercharger 4, this operation will take place automatically in the case of the actuator of FIG. 4, this being true also of the systems of FIGS. 5 to 7.

If no air is supercharged into duct 5 by supercharger 4, no charge air will be aspirated by way of pipe 3 (FIG. 1), so that there will be no vacuum in the latter. Diaphragm valve 106 will, for this reason, go back into its illustrated rest position, i.e., there will no longer be any vacuum "input," the piston space 46" will be opened to atmosphere and the valve 8 will be closed by the returning force of spring 67.

In the further embodiment of FIG. 5, the first part of the motion of valve 8 is caused by supercharging pressure, as in FIG. 4, while on the other hand the actuator is, generally speaking, vacuum-powered and in this respect the intake pressure level upstream for supercharger 4 is used as a control signal not shown in FIG. 5. On the other hand, the supercharging pressure does not take effect in the space 46' between the pistons and, in fact, is responsible for starting the opening motion by directly acting on valve 8. For this reason, valve 8 is eccentrically supported, i.e., its bearing is at a distance e from the center with respect to the valve working face. This eccentric amount is of such a size that, because the valve 8 is not acted upon symmetrically, it is at least turned out of position a certain amount so that the opening motion is started, the opening valve then being taken along, as in the working example of FIG. 4, by the pulling force of the vacuum acting on piston 69 and 70.

This embodiment has the advantage not produced by the previously described embodiments, that the space 46' between the pistons and, more specially the sealing faces, are not likely to be polluted by the entry of dirty air.

A further simplification of the system is shown in FIG. 6, in which, without any use of the supercharging air, the outer piston space 46" is directly connected with the vacuum, i.e., the spring-loaded valve 102 for shutting off the opening 101 at the start can be eliminated. This solution is useful in all those cases in which the engine can be operated at a high pressure upstream of the shut valve 8, and a strong heating effect in the supercharger is produced by the hot engine exhaust gases.

If this is not the case, the FIG. 4 or FIG. 5 embodiment may be used, in which the spring 67 may be so designed that, upon a supercharger drop-out, an eventual high exhaust gas pressure in the boost air duct has the effect of partly opening the valve, although not to such a degree as to cause smothering of the IC engine, because such exhaust gas will be mixed with fresh air entering by way of vent valve 11 but, on the other hand, enough to permit exhaust gas circulation. Under such a condition the speed of the IC engine will go down, there will be decrease in the exhaust pressure, the valve 8 will be closed completely and the IC engine will be running as an unblown engine.

FIG. 7 is a view of an actuator control system in the case of which air valve 8 is only kept open by boosting or supercharging air. By way of duct 5', supercharging air makes its way past a spring-loaded check valve 103 into the outer piston space 46". In contrast to the preceding embodiments, however, pistons 69 and 70 are in this case not moved away from each other for opening the valve, but rather towards each other. Because of the manner of operation of the check valve, the greatest pressure level in the boost air duct will be stored in the piston space 46" so that valve 8 will be locked in the open position against the return force of the appropriately dimensioned spring 67. For shutting the valve, the piston space must be connected with the atmosphere (by way of line 104), this occurring automatically by means of a spring-loaded diaphragm valve 105, when the vacuum (by way of pipe 107) acting on the diaphragm and entering by way of intake pipe 3, arranged upstream from the supercharger 4, is no longer effective, e.g., when the supercharger is stopped.

Figure 8:
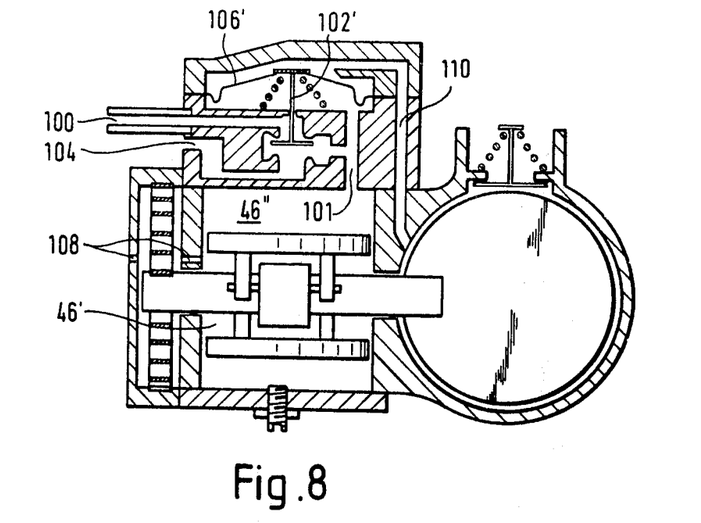

FIG. 8 is a view of a vacuum-powered actuator in the case of which, in contrast to the embodiments of FIGS. 4, 5, 6 and 7, the control of vacuum power is by way of a diaphragm valve acted upon by the supercharging pressure in boost air duct 5. The spring-loaded diaphragm 106' actuates the two-way valve 102 which connects the piston space 46" with vent line 104 or vacuum line 100. The diaphragm valve is so designed that, when the system is under vacuum, such vacuum also takes effect on the lower side of the diaphragm, supporting the effect of the supercharging pressure, taking effect by way of line 110 on the top side of the diaphragm. If the supercharging pressure collapses, the pulling force produced by the vacuum on the lower side of the diaphragm will be enough to keep the vent line closed. It is only when the vacuum pump is shut down on the engine itself being shut down, that there will no longer be any vacuum in the piston space 46' and the valve 8 will be closed. In this variant of the invention, operation of the engine is possible, with the air valve shut, up to a certain control pressure, i.e., the supercharging air pressure.

In the case of the actuators of FIGS. 5, 6, 7 and 8, the space 46' between the pistons is permanently connected with atmosphere by vent 108.

Figure 9:
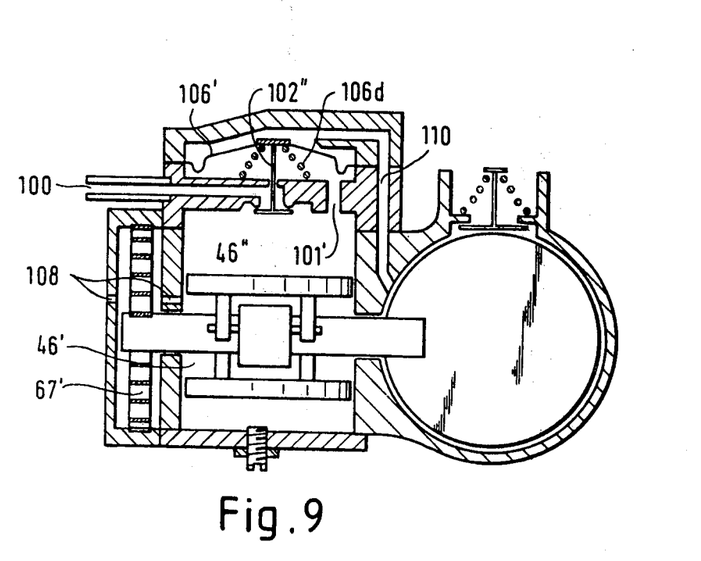

FIG. 9 is a view of a further vacuum part actuator in the case of which the vacuum level is controlled as in the embodiment of FIG. 8 by way of a diaphragm valve 106' acted upon by the supercharging pressure. In contrast to the embodiment of FIG. 8, the spring-loaded diaphragm 106' actuates an on-off valve 102" which connects and disconnects vacuum line 100 from piston space 46".

If the top face of diaphragm 106' is acted upon by the supercharging pressure through line 110, valve 102' is opened so that, by way of line 100, the vacuum takes effect in the piston space 46". By way of line 101', connecting piston space 46" with the lower face of diaphragm 106', the vacuum will also take effect under diaphragm 106' so that, as in the embodiment of FIG. 8, the effect of the supercharging pressure on the top side of diaphragm 106' will be supported, i.e., that the overall force on the diaphragm will be greater. Upon fall of the supercharging pressure to zero, the pull of the vacuum on the lower face of the diaphragm will be great enough to keep the valve 102" open against the force of the diaphragm spring 106b. Only on shutting down the vacuum pump when the engine is stopped, air will make its way into the piston space 46", so that the vacuum will come to an end, by way of valve 102" which is still open, and air valve 8 will go into its closed position. For this purpose, springs 106d and 67' under the diaphragm 106' or on the valve shaft 27 are of such a size and force relative to one another that, when the vacuum in the piston space 46" comes to an end, because of the force of the spring 67', the pistons 69 and 70 will move away from each other and the air valve with them into its closed position before valve 102" is pulled into closed position by spring 106d.

Valve 102" may be kept for a short time in the open position to permit destruction of the vacuum in the piston space 46", by the supercharging air pressure over diaphragm 106, in which case such pressure would be released at a rate lower than the destruction of the vacuum, by use of a choke check valve (not shown) in line 110.

It will be clear that the invention is not limited to the described and illustrated embodiments. For example, in place of two pistons, a single piston may be used.

Furthermore, the pistons 69 and 70 need not be wobbling pistons. Those skilled in the art will readily be able to make use of more complex designs in which legs 73, 74 and 75, 76 would be jointedly attached to the pistons. Furthermore, in place of having two legs on each piston, it would be possible to have only one, which would then be taken up in a radial slot of lever 68 so as to produce a turning connection at this point. Furthermore, the lever 68 may be unitary with shaft 27.

We claim:

1. An apparatus for actuating an air throttle valve in the intake manifold of an internal combustion engine, particularly such an engine super-charged by a pressure wave super-charger, an air throttle valve disposed in an intake manifold and moveable between open and closed positions, spring means operatively connected to said air throttle valve for maintaining said air throttle valve in its closed position while the engine is shut off and while the engine is in a cold starting phase, during the cold starting phase there is a build-up in pressure of charge air in the intake manifold in front of the closed air throttle valve, a breather valve by-passing said air throttle valve to supply the engine with charge air around the closed air throttle valve, a pneumatic actuator operatively connected to said air throttle valve and operable by one of a pressure and a vacuum, said spring means being so selected and said actuator being so constructed that the charge air pressure accumulated in front of the closed air throttle valve at the end of the cold starting phase is sufficient to initiate the opening movement of the air throttle valve against the force of said spring means, said air throttle valve being further moved into its full open position by means of one of the charge air pressure and a vacuum, said air throttle valve being maintained in said open position while the engine is running, said air throttle valve returning to its closed position under the force of said spring means after the engine is shut down.

2. An actuator as claimed in claim 1, wherein the air valve (8) is fixed on a shaft (27) running out through the wall of the boost air duct so that the air valve (8) is pivotally mounted within the boost air duct (5), a spiral coiled spring (67) having one end attached to said shaft (27) and another end fixed to a housing for said actuator for turning the shaft into the shut position of the air valve and for turning of the shaft in the opposite direction it is acted upon in the opening direction of the air valve by at least one piston (69, 70) by way of a lever system (68, 73, 74, 75, 76).

3. An actuator as claimed in claim 2, wherein said the spring (67) is a bimetallic spring which is of such a size that the air valve (8) only goes into the shut position, after stopping of the engine (1), when the engine has cooled down to a given temperature.

4. An actuator as claimed in claim 2, wherein said at least one piston (69, 70) is pneumatic and both sides thereof can be acted upon.

5. An actuator as claimed in claim 2, wherein the pressure acting on said at least one piston (69, 70) is taken by way of a first air pipe (5') or opening (79) from the part of the boost air duct which is on the upstream side of the air valve (8).

6. An actuator as claimed in claim 2 or claim 5, wherein the pressure acting on the piston (69, 70) is taken by way of a vacuum line (100) coming from a vacuum source, for example the vacuum pump of the force amplifier of a power braking system.

7. An actuator as claimed in claim 2, wherein at least one piston (69, 70) is placed in a cylinder housing (46) having the shaft (27) running through and across it and the piston (69, 70) as an eccentric leg (73, 74, 75, 76) turningly joined with a connection lever (68) keyed on the shaft.

8. An actuator as claimed in claim 7, wherein said the eccentric leg (73, 74, 75, 76) on the piston (69, 70) is fixed to the same, the outer face of the piston being barrel-like in form and having a middle piston groove with a piston ring (71, 72) in it, which, at its inner edge, has a dovetail-like section with two sealing lips, the lips resting elastically on axially opposite groove walls like check valves.

9. An actuator as claimed in claim 7 or claim 8, wherein the cylinder housing (46) contains two pistons (69 and 70) are placed which are moved away from each other by the driving force, the pistons having eccentric legs (73, 74, 75, 76) which are turningly joined with the connection lever (68) at points which are opposite to each other radially with respect to the shaft (27).

10. An actuator as claimed in claim 9, wherein the inner piston space (46') between the two opposite faces of the two pistons is joined up by way of the opening (79) or the first air pipe (5') with the air intake pipe (5).

11. An actuator as claimed in claim 10, wherein, within the first air pipe (5') branching off from the air intake pipe (5), there is a spring-loaded check valve (103) and between the same and the acted-upon piston (69, 70), a breather line (104) which may be shut off.

12. An actuator as claimed in claim 11, wherein said the breather line (104) may be shut off by way of a diaphragm-powered spring-loaded valve (105) for which purpose the necessary vacuum effect is taken from a second air line (107) from the intake pipe (3) placed on the upstream side of the supercharger (4).

13. An actuator as claimed in claims 9, wherein the outer piston space (46") limited by the opposite faces of the two pistons (69, 70) is joined up with a vacuum line (100) by way of an opening (101) having a spring-loaded valve (102, 102').

14. An actuator as claimed in claim 13, wherein the bearing of the air valve (8) is placed eccentrically with respect to the face of the air valve so that, because of the unbalanced pressure effect on the valve produced by the pressure in the blown air intake pipe, at least the start of opening motion of the valve may be caused to take place.

15. An actuator as claimed in claim claim 14, wherein the spring-loaded valve (102) is acted upon by a diaphragm (106) which is acted upon by compressed air, and the necessary vacuum takes effect by way of a second air line (107') joined with the intake pipe (3) on the upstream side of the supercharger (4).

16. An actuator as claimed in claim 13, wherein the spring-loaded valve (102') is worked by way of a diaphragm (106') acted upon by compressed air, for which purpose the necessary gage pressure is taken from the boost air duct (5).

17. An actuator as claimed in claim 16, wherein the space on one side of the diaphragm (106') is joined up with the boost air duct and the space on the other side of the diaphragm (106') is joined up by way of the valve (102', 102") with a vacuum line (100).

18. An actuator as claimed in claim 17, wherein a valve with two seats (102') designed for joining, in its one valve position going against the force of a spring acting on the diaphragm, the outer piston space (46") with the vacuum line (100) while the piston space (46") is shut off from the breather line (104) while in its upper valve position, into which it is moved by the spring, it has the effect of joining the outer piston space (46") with the breather line (104) and the connection between the piston space (46") and the vacuum line is shut off.

19. An actuator as claimed in claim 7 wherein a cylindrical pipe part (9), joined with the blown air intake pipe (5), taking the form of a butterfly air valve housing, is joined up with the cylinder housing (10) for forming a structure unit, which, spaced from the inlet side of the air valve, has an opening for the breather valve (11), and a side opening (51) centered on the shaft (27), in the cylinder housing (10) may be shut off by a cover (53, 54), such cover furthermore functioning at the same time as a bearing for the end (36) of the shaft, the shaft stretching through an opening (42) in the housing wall (43) between the cylinder housing (10) and the air valve housing (9), the other end (32) of the shaft being joined with the air valve (8).

20. An actuator as claimed in claim 19, wherein the cylinder housing (10) is shut off at each end by separate end plates (48, 49) and at least one end plate (48) has a threaded hole for an adjustment screw (84) whose end running out into the cylinder space is used as a stop for limiting motion of the pistons (69, 70) and in that each end plate has at least one opening (80, 81) covered by an air filter plate (82, 83).

\* \* \* \* \*

UNITED STATES PATENT AND TRADEMARK OFFICE
CERTIFICATE OF CORRECTION

PATENT NO. : 4,414,952
DATED : November 15, 1983
INVENTOR(S) : Fried et al.

It is certified that error appears in the above—identified patent and that said Letters Patent is hereby corrected as shown below:

Include the priority data as follows:

--Foreign Application Priority Data

June 8, 1979 [EU]     Europe ........... 79101815.3--

Signed and Sealed this

Seventh Day of May 1985

[SEAL]

Attest:

DONALD J. QUIGG

Attesting Officer          Acting Commissioner of Patents and Trademarks